358-84. XR 3,703,684 SR

United States Patent

McVoy

[15] 3,703,684

[45] Nov. 21, 1972

[54] CHANNEL MONITORING SYSTEM FOR AUDIENCE SURVEY PURPOSES

[72] Inventor: David S. McVoy, Sarasota, Fla.

[73] Assignee: Coaxial Scientific Corporation, Sarasota, Fla.

[22] Filed: Jan. 25, 1971

[21] Appl. No.: 109,162

[52] U.S. Cl.....................325/31, 325/311, 179/2 AS, 178/5.6, 178/5.8 R, 178/DIG. 13

[51] Int. Cl..............................H04h 1/04, H04b 3/46

[58] Field of Search...............179/2 AS; 325/31, 311; 178/5.8 R, DIG. 13, 5.6

[56] References Cited

UNITED STATES PATENTS 3,397,402 8/1968 Schneider.............325/311 X

OTHER PUBLICATIONS

Tele-X Tech May 1949 pp. 38-39, 64-65

*Primary Examiner*—Robert L. Richardson
*Attorney*—Olson, Trexler, Wolters & Bushnell

[57] ABSTRACT

A coaxial cable system for television communications or the like comprises an arrangement for sending a control signal selectively on the audio sub-carrier of each of a number of television channels. Receivers connected to the cable have circuitry for detecting the presence of the control signal when tuned to a channel over which the control signal is being sent. Each receiver has monitor signal generating circuitry that transmits a unique monitoring signal responsive to detection of the control signal. The monitoring signal is transmitted to monitoring circuitry at the headend of the cable, and the monitoring circuitry detects the presence or absence of the monitoring signal from each receiver, thereby indicating if the receiver is tuned to a particular channel.

4 Claims, 3 Drawing Figures

TX 5027 Rh

Inventor
DAVID S. McVOY

By Olson, Trexler, Wolters & Bushnell
Attorneys

Inventor
DAVID S. McVOY

By
Olson, Trexler, Wolters + Bushnell
Attorneys

CHANNEL MONITORING SYSTEM FOR AUDIENCE SURVEY PURPOSES

BACKGROUND OF THE INVENTION

This invention relates to a system for determining the channel to which a communications receiver is tuned.

In communications systems, such as cable television and FM radio systems, it is desirable for the cable operator to be able to ascertain the particular channel any receiver connected to the cable is tuned to at a preselected time. Thus, by determining the channels tuned to by all or at least a very large portion of the subscribers, an accurate assessment of the popularity of the programming can be made. Prior techniques of sampling viewer or listener preference have often inconvenienced the viewer or listener, and in addition the reliability of the samples obtained have been subject to question.

OBJECTS AND SUMMARY OF THE INVENTION

It is an object of this invention to provide a monitoring arrangement which can be embodied in a cable communications system (e.g., for television, radio, etc.), and which permits the cable operator to monitor each properly equipped receiver connected to the cable so that at any time it can be quickly and easily determined which subscribers are tuned to which channels.

It is a further object of this invention to provide a monitoring arrangement of the type and for the purpose stated that does not inconvenience viewers or listeners when the cable operator is determining the channel tuned to by a particular receiver.

A still further object of this invention is to provide a monitoring arrangement of the type and for the purpose stated which necessitates only a relatively inexpensive modification of existing television receivers or radio receivers, or like communications receivers, as the case may be, in order to be equipped for monitoring.

In accordance with the foregoing objects the present invention contemplates the transmission over the cable of information-containing signals over a plurality of channels and the selective introduction of a control signal for transmission with the information-containing signals whereby the control signal is used in a properly equipped receiver to actuate a coded message in the form of a monitoring signal. The control signal is applied to a particular channel when it is desired to determine which receivers are tuned to that channel. By way of example, the control signal may be a low frequency audio tone that modulates the audio channel carrier. In a typical cable television system the control signal may be mixed with the audio information so that the control signal will appear with the demodulated audio, for instance at the output of the audio amplifier of a conventional television receiver. The monitoring signal may be generated from an audio oscillator that is operated upon detection by suitable circuitry connected to the output of the aforesaid audio amplifier and which circuitry operates an electronic switch to turn on the monitoring signal oscillator. The monitoring signal may be used to modulate a radio frequency carrier that is unique for the particular receiver, and thus constitutes a coded representation thereof. The monitoring signal modulated radio frequency carrier is sent back over the cable to monitoring circuitry at the cable headend or elsewhere remote from the receiver. The monitoring circuitry itself may be a tunable receiver and may be selectively tuned to any one of the unique radio frequency monitoring carriers for any particular receiver. When so tuned the monitoring signal carrier is demodulated and the monitoring signal audio tone can be used to actuate an electronic switch that operates an indicator to give a visual or recorded indication that a particular receiver is then tuned to a particular channel.

While the invention contemplates modulating a unique monitoring radio frequency carrier by an audio tone and transmission back over the cable, it is within the scope of the invention simply to use unique monitoring audio tones for each receiver and transmit those signals over telephone lines to suitable monitoring circuitry.

DETAILED DESCRIPTION

Figures 1, 2:
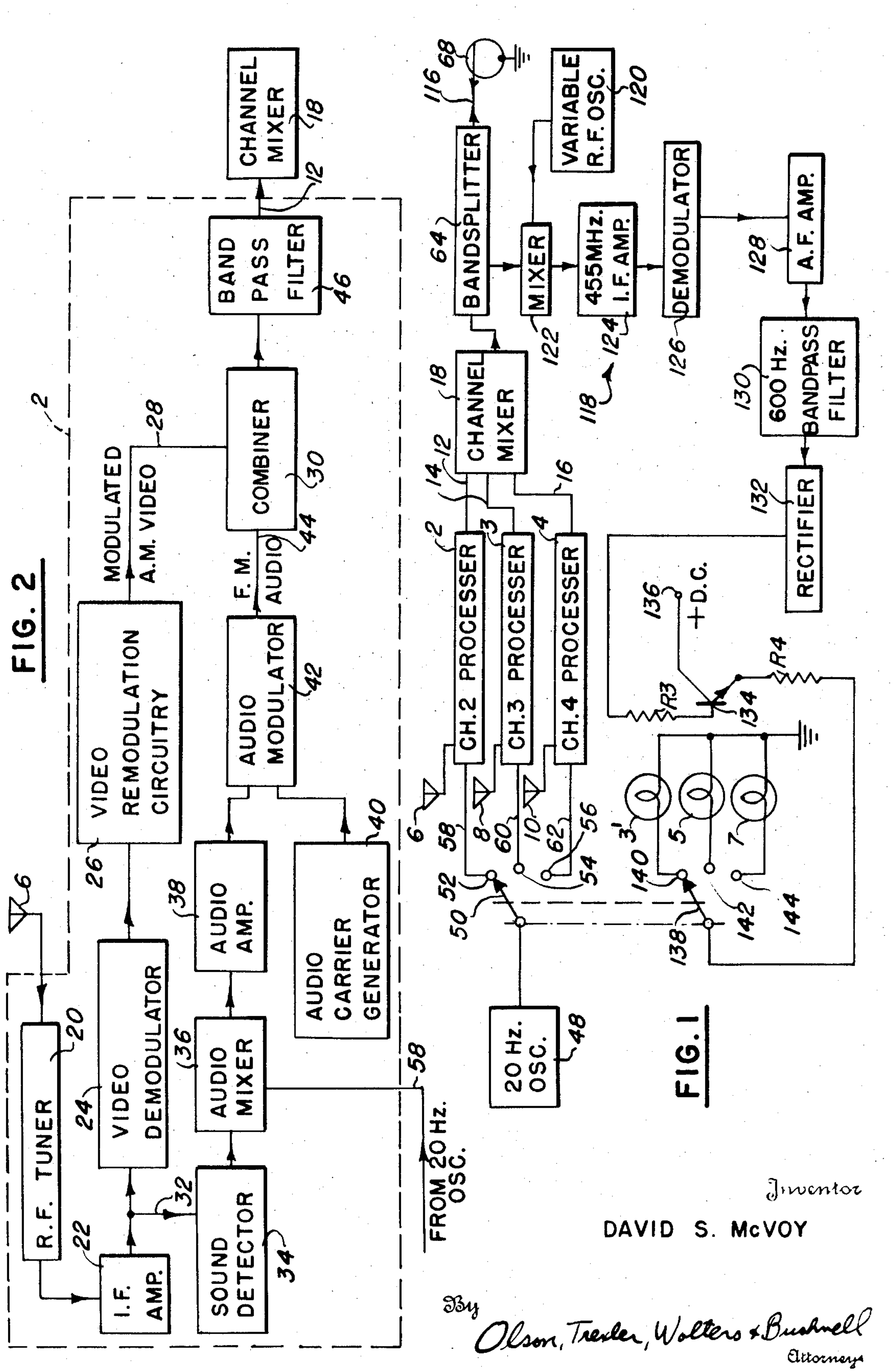
FIG. 1 is a block diagram of headend equipment which forms part of the present invention.
FIG. 2 is a block diagram of one of the channel processors shown in FIG. 1.

Referring now in more detail to the drawing FIG. 1 shows a series of channel processers 2, 3, 4 which receive signals from their respective antennas 6, 8, 10. In a typical arrangement the signals received by the antennas 6, 8, 10 are broadcast from television transmitters and are processed by the processers 2, 3, 4 after which the output signals from the processers are sent over conductors 12, 14, 16 to a channel mixer 18. While the herein described embodiment of the present invention is concerned with television, the principles of the invention are equally applicable to communications systems not concerned with video information, such as FM broadcasting. Furthermore, while three processers are herein shown, it will be apparent that the number illustrated is merely representative of a plurality of processers since there could be any number of them, one being for each channel.

FIG. 2 shows a typical processer, it being understood that the other processers are of like construction. The processer 2 of FIG. 2 is of the demodulation-remodulation type and includes an RF tuner 20 that is tuned to the standard television "channel 2" such that the output therefrom will be at the conventional intermediate frequency and will be sent to the I.F. amplifier 22. The video signals of the channel are demodulated in a video demodulator 24 and subsequently remodulated in conventional circuitry 26 so that the amplitude modulated video signals are sent over conductor 28 to a combiner or coupler 30. The audio portion of the channel is sent over conductor 32 to a sound detector 34 and from there through an audio mixer 36 and to audio amplifier 38. The purpose of the audio mixer 36 will be presently more fully described. The amplified audio signal frequency modulates the audio carrier from the generator 40, and the F.M. output of the audio modulator 42 is sent over conductor 44 to the combiner 30. The amplitude modulated video and the frequency modulated audio are sent from the combiner 30 to a bandpass filter for the particular channel being transmitted and from there along conductor 12 to the channel mixer 18. In connection with the signal processer 2, it should be pointed out that the processing has the advantage of removing extraneous signals so that only the desired frequencies will be introduced into the cable system. Furthermore, the use of processers equips the cable headend for original programming.

The headend equipment also includes a 20Hz oscillator 48 the output of which is sent to a movable switch contact 50 that is adapted for selective engagement with fixed contacts 52, 54, 56 so that the 20Hz tone may be selectively sent over conductors 58, 60, 62 to any of the processers 2, 3, 4. The movable contact 50 is illustrated in engagement with the fixed contact 52 for transmission of the 20Hz tone to the channel processer 2. Thus, referring to FIG. 2 it will be seen that the 20Hz tone is sent into the audio mixer 36 whereby the 20 cycle tone will appear on the audio carrier along with the other audio information.

Figure 3:
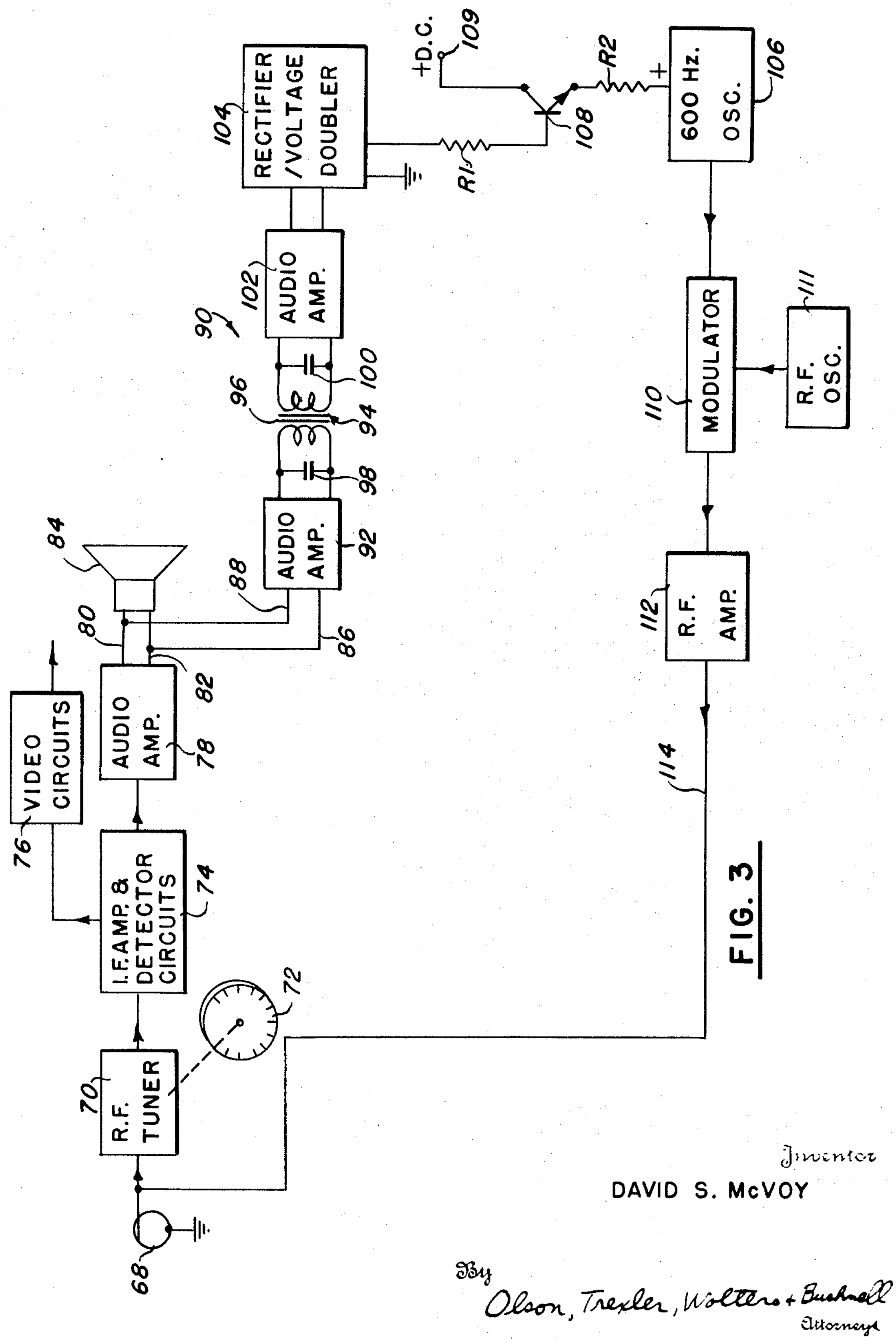
FIG. 3 is a block diagram of a communications receiver in accordance with the present invention.

The output from the channel mixer 18 is sent to a bandsplitter 64 the purpose of which will be hereinafter described, but suffice it to say that the bandsplitter 64 is such that all of the channel carriers are transmitted to the coaxial cable 68. A number of receivers are connected to the coaxial cable 68 in the usual manner. One such receiver is shown in FIG. 3, it being understood that the other receivers are of similar construction.

The receiver shown is a typical television receiver modified according to the present invention. The receiver includes an R.F. tuner 70 having a channel selector 72 by which the various channel frequencies from the cable 68 may be selected by the subscriber. The receiver includes I.F. amplifier and detector circuits 74, video circuits 76 for driving the video transducer, and an audio amplifier 78 that sends its output over wires 80, 82 to a loudspeaker 84, all of which is conventional. However, in accordance with the invention conductors 86, 88 tapoff the loudspeaker wires 80, 82 for transmission of audio signals to control signal detector circuitry generally designated at 90.

The control circuitry 90 includes an audio amplifier 92 the output from which is sent to a tuned circuit 94 having a resonant frequency which is the same as that of the control signal, in this case 20Hz. The tuned circuit 94 typically has an inductance 96 aNd capacitors 98, 100. The output from the tuned circuit 94 is sent to a second audio amplifier 102 and from there to a rectifier/voltage doubler circuit 104 to provide a D.C. output of desired magnitude. A normally open electronic switch is closed by the output from the rectifier/voltage doubler 104 for the purpose of turning on a monitor signal audio oscillator 106 (for example 600Hz) when the 20Hz tone is on the channel to which the receiver is tuned. The electronic switch may take the form of a transistor 108 through which power supply voltage from a D.C. source at 109 (e.g., tapped from the low voltage power supply of the receiver) may be applied across resistor R2 to the oscillator 106. The base of the transistor 108 may be coupled through resistor R1 to the output of circuit 104 such that the transistor 108 is normally non-conducting. However, when a signal is applied to the transistor base thus representing a detection of the 20Hz tone on the channel tuned, the oscillator 106 will operate.

The signal from the oscillator 106 may be sent to suitable monitoring circuitry in a variety of ways. In the form of the invention herein shown, the cable system is designed for two way communication and so the audio monitoring signal from oscillator 106 may be used to modulate a monitoring R.F. carrier that is unique for each receiver connected to the cable 68. Thus, the cable system is frequency division multiplexed with a unique R.F. carrier in the reverse direction for each receiver. The R.F. oscillator 111 is tuned to such unique frequency which may be of the order of 5MHz or such other radio frequencies that do not interfere with other functions of the cable system. By way of example, the oscillator 111 of different receivers may have frequencies that differ by 10KHz, which will make the signal from one oscillator 111 readily discernable from that of another.

The modulated R.F. monitoring carrier from modulator 110 is amplified in an R.F. amplifier 112 and sent over a coaxial conductor 114 to the main cable 68 and via cable 116 to the bandsplitter 64 (FIG. 1). Since the bandsplitter 64 is a two band bi-directional device and designed to pass the R.F. carrier band, the monitoring R.F. carrier is sent from the bandsplitter 64 to the monitoring circuitry, generally designated at 118.

One form of monitoring circuitry is essentially a superheterodyne receiver and includes a tunable oscillator 120 that sends a signal into mixer 122 whereby the output of the mixer 122 is an intermediate frequency of 455MHz, although some other I.F. could be used. The oscillator 120 is thus tunable to the frequencies of the oscillators 111 of the various receivers plus 455MHz so that the difference signal between the output of oscillator 120 and the input to the mixer 122 will be 455MHz. Instead of a tunable oscillator 120 a group of pre-tuned oscillators may be used, the signals from which are fed into the mixer one at a time. Thus, the circuitry 118 may be used to tune in a monitoring signal carrier of a receiver. If desired, the oscillator 120 may be calibrated in terms of frequency or other identification as to each receiver. The I.F. signal is then conventionally amplified in amplifier 124, demodulated in circuit 126, and the audio output therefrom amplified in amplifier 128. The output of the amplifier 128 is sent to a bandpass filter 130 for passing signals of the frequency of the A.F. oscillator 106, and the output from the filter is then rectified or detected in the rectifier 132.

The D.C. output from the rectifier 132 is delivered through resistor R3 to the base of switching transistor 134 that serves as a normally open electronic switch, functioning similar to the transistor 108. Thus, when a signal is applied to the base of transistor 134, the transistor will conduct and a D.C. voltage from a source 135 will be applied to a movable switch contact 138 that is ganged or otherwise operatively connected for movement with the switch contact 50. The switch contact 138 selectively engages fixed contacts 140, 142, 144 for operating channel indicators 3', 5, 7, one indicator being for each channel. In a simple form of the invention the indicators 3', 5, 7 may be signalling devices such as lamps, but they may also be audio devices or devices for making recorded indications, for instance, magnetic data storage media.

With the switch contact 50 in engagement with the contact 52 and the contact 138 in engagement with the contact 130 the system is placed in condition for determining which receivers connected to the cable 68 are viewing the channel identified herein as "channel 2." The 20Hz audio tone will be sent to the audio mixer 36 and will thus be transmitted over the cable on the audio carrier along with the other audio information. If a receiver of the type shown in FIG. 3 is tuned to "channel 2," the 20Hz control signal will appear at the loudspeaker wires 80, 82 and so will be sent through the control circuitry 90. Since the control circuitry 90 has a circuit 94 that is tuned to 20Hz, a 20Hz tone will be sent into the audio amplifier 102 which ultimately results in a signal appearing at the base of the transistor 108 causing the oscillator 106 to commence operating. The radio frequency carrier that is modulated by the 600Hz tone will be sent back over the cable 68 and through the bandsplitter 64 to the monitoring circuitry 118. The variable oscillator 120 is tuned for reception of the monitoring R.F. carrier for each receiver that is connected to the cable and which is equipped with the detecting and monitor signalling arrangement of FIG. 3. If a particular set is tuned to "channel 2," the R.F. monitoring carrier will be passed through the amplifier 124 and a 600Hz tone will ultimately be sent to rectifier 132. The output of the rectifier 132 switches the transistor 134 on so that the indicator 3' for "channel 3" is actuated, thereby indicating that a particular receiver is tuned to "channel 20" Of course, if the receiver is not tuned to "channel 2" no 20 cycle tone will appear therein at the loudspeaker input wires 80, 82 and so the oscillator 106 will not operate. No monitoring signal is, therefore, sent back over the cable and as a result the indicator lamp 3' will not be turned on.

A determination as to which receivers connected to the cable 68 are viewing "channel 3" and "channel 4" etc. is made in a manner similar to that previously described. Thus, the movable contacts 50, 138 may be shifted to engage respectively the contacts 54, 142 so that the foregoing procedure can be carried out with respect to "channel 3."

The contacts 50, 139 could be moved manually or under control of a computer or timing device that is programmed to effect monitoring of certain channels at certain times. Likewise, the computer could be used to tune the variable oscillator 120 so that the unique radio frequency monitoring carrier for each receiver will successively be mixed with the signal from the oscillator 120 to provide the requisite I.F. signal output from the mixer 122.

The 20Hz control signal is chosen since it is of a frequency that ordinarily will not disrupt the audio reception of the receiver since most loudspeaker systems in television sets will not respond to this frequency or, in fact, even to frequencies below about 30 cycles per second, which might also be used.

The invention is claimed as follows:

1. A communications system having means for transmitting information-containing signals over a plurality of channels, means for selectively introducing a control signal for transmission with the signals over each channel, means for receiving said signals, said receiving means including means for selective tuning to said channels to receive selectively said signals thereon, said receiving means also including circuitry for detecting the presence of said control signal on each channel, said receiver further having means for generating a monitoring signal responsive to the detection of said control signal on the selected channel to which said receiving means is tuned; said generating means comprising a first oscillator for generating a radio frequency signal, a second oscillator for generating an audio frequency signal, and means for modulating the radio frequency signal by the audio frequency signal; first electronic switching means actuated by said detection circuitry upon detection of said control signal for effecting the operation of said audio frequency oscillator, monitoring circuitry remote from said receiving means and having indicator means responsive to reception by said monitoring circuitry of said monitoring signal for indicating the presence of said monitoring signal and thereby indicate that the receiver is tuned to an identified channel; said monitoring circuitry including tunable means for demodulating the radio frequency signal to provide an audio frequency output representing the monitoring signal, and second electronic switching means responsive to said last-mentioned audio frequency signal to effect the operation of said indicator means; and means forming a transmission link between said receiving means and said monitoring circuitry for transmitting said monitoring signal to said monitoring circuitry.

2. A communications system according to claim 1 including a plurality of said receivers for receiving said signals, the means for generating the monitoring signal for each receiver generating a monitoring signal that is unique for each receiver, and said monitoring circuitry including means by which the monitoring signal for each receiving means may be distinguished and caused to actuate said indicator means.

3. A communications system according to claim 1 in which said receiving means includes a transducer that is responsive to the information of said information-containing signals.

4. A communications system according to claim 1 in which said information-containing signals modulate radio frequency carriers and the modulated radio frequency carriers are transmitted to said receiving means over said transmission link, and said transmission link includes a coaxial cable.

* * * * *